Figure 1:
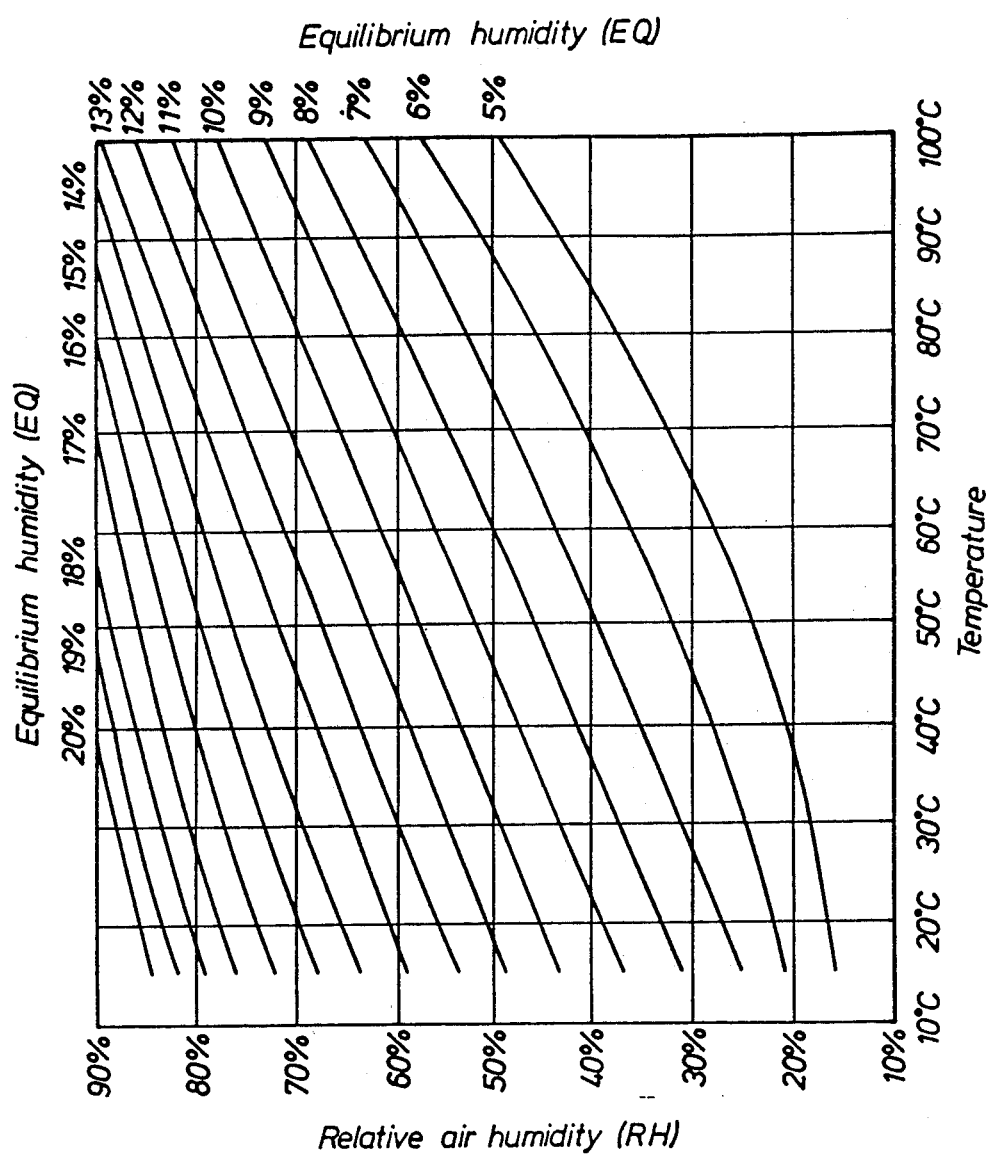

United States Patent [19]

Moldrup

[11] Patent Number: 4,893,415
[45] Date of Patent: Jan. 16, 1990

[54] METHOD FOR THE DRYING OF WOOD AND WOOD-BASED PRODUCTS

[76] Inventor: Steen Ole Moldrup, Magstraede 4, 1204 Copenhagen K, Denmark

[21] Appl. No.: 110,694
[22] PCT Filed: Feb. 6, 1987
[86] PCT No.: PCT/DK87/00012
 § 371 Date: Feb. 6, 1988
 § 102(e) Date: Feb. 6, 1988
[87] PCT Pub. No.: WO87/04779
 PCT Pub. Date: Aug. 13, 1987

[30] Foreign Application Priority Data

Feb. 6, 1986 [DK] Denmark .................. 592/86

[51] Int. Cl.$^4$ ................................. F28B 5/04
[52] U.S. Cl. ........................... 34/16.5; 34/60; 34/77; 34/92
[58] Field of Search ............ 34/15, 92, 16.5, 77, 34/60

[56] References Cited

U.S. PATENT DOCUMENTS

| | | | |
|---|---|---|---|
| 1,328,657 | 11/1919 | Fish | 34/16.5 X |
| 4,127,946 | 12/1978 | Buchholz | 34/16.5 X |
| 4,467,532 | 8/1984 | Drake | 34/92 X |

Primary Examiner—Henry A. Bennet
Attorney, Agent, or Firm—Darby & Darby

[57] ABSTRACT

In the vacuum drying of solid wood (2) and other wood-based products, the invention provides a method of achieving a better control of the drying process and a better heat economy than by the traditional methods of vacuum drying. This is achieved by completely evacuating the air from the space around the wood (2), and instead to fill the space (1) around the wood (2) with superheated water vapors (11). By maintaining a uniform pressure and temperature in all parts of the drying chamber (1) during the drying process, and controlling the temperature and the pressure of the superheated water vapors (11) in accordance with directives described in more detail, it is possible to control the dampness (MC) of the wood very precisely, and thereby to avoid damage to the wood (2) during drying. By at the same time providing the drying plant with a heat pump system (13) and condensing the water vapors (11) which have evaporated from the wood in a separate cooler condensation tank (15), it is possible with very low energy consumption to recover and re-use the main part of that thermal energy which is used in the drying. This is effected by using the wood (2) existing in the drying chamber (1) as a heat buffer, and controlling the temperature in the cooler condensation tank (15) and in the drying chamber (1) in accordance with more closely detailed directives.

12 Claims, 8 Drawing Sheets

METHOD FOR THE DRYING OF WOOD AND WOOD-BASED PRODUCTS

The application relates to a method for the removal of moisture from solid wood and other wood-based products, where the wood is first stacked with suitable air space in a drying chamber which is arranged to be able to withstand a vacuum and temperatures of up to 100° C, after which the drying chamber is closed and evacuated during the application of heat for the boiling out of the moisture bound in the wood.

When felled, wood contains large amounts of water, and in most applications of wood it is necessary for the main part of this water to be removed from the wood before the wood is taken into use.

During the drying of wood, a number of special conditions manifest themselves:
(a) Wood is a hygroscopic material, and the dampness of the wood will adjust itself to a wood dampness (moisture balance) which depends on the temperature and the humidity of the surroundings.
(b) Wood shrinks during the drying, and the shrinkage is proportional to the amount of hygroscopic water which is removed from the wood.
(c) During the drying, most kinds of wood cannot tolerate temperatures which exceed 40–90° C. At higher temperatures, most kinds of wood will be subject to damage in the form of discoloration and a reduction in the strength of the wood.
(d) In the drying of wood, very large amounts of energy are used. With traditional drying, the consumption of energy is thus between 2,000,000 and 6,000,000 kJ per m³ of dried wood.

Traditionally, the drying of wood is carried out by placing the wood to be dried in the open air (air drying), or by drying in special drying chambers where hot air is circulated around the wood (artificial drying). However, both of these methods are very slow. When drying in the open air, a drying time from a few months up to several years must be expected, while the drying time with artificial drying is from a week up to a few months.

In order to avoid damage to the wood during the drying, it is important that the shrinkage during the drying is uniform, and this is achieved by controlling the moisture balance dictated by the temperature and the humidity, so that the moisture in the surface of the wood does not at any time during the drying deviate too much from the moisture within the wood.

When air drying, the possibilities of controlling the drying process are very small, whereas artificial drying provides the possibility of reasonable control of the drying process. This is effected by regulating the humidity and the temperature of the air which is circulated around the wood during the drying. The humidity is controlled by means of a hygrometer or a dry- and wet-thermometer in the application of steam or dry air to the air around the wood.

To increase the speed at which the water is removed from the wood, for many years it has been normal practice to dry certain kinds of wood at temperatures in excess of 100° C (FR patent publication No. 1,023,606). At temperatures above 100° C (high-temperature drying), the water in the wood will be boiled out of the wood.

However, most kinds of wood cannot tolerate temperatures of more than 40–90° C, and in order to increase the speed at which these kinds of wood can be dried, it has been suggested from several quarters that the drying should be effected under vacuum. Under vacuum, the boiling point of the water is reduced, and thus the water will be able to be boiled out of the wood, even though the temperature does not exceed 40–90° C.

Traditionally, one distinguishes between two forms of vacuum drying: Discontinuous and continuous vacuum drying.

With the discontinuous vacuum drying, alternate changes are made during the drying between a heating phase and an evacuation phase. During the heating phase, the wood is heated by circulating hot air in the drying chamber (DK Pat. publication No. 44,287, US Pat. publication No. 4,058,906, U.S. Pat. publication No. 4,176,466, U.S. Pat. publication No. 4,194,296 and U.S. Pat. publication No. 4,198,763) or by high-frequency (dielectric heating) (U.S. Pat. publication No. 3,685,959). The heat which is applied during the heating phase is utilized during the evacuation phase for evaporation of water from the wood by establishing a vacuum in the drying chamber. During the evacuation phase, no heat is applied to the wood, and the wood will gradually cool down as that heat which is applied during the heating phase is used in the evaporation of water. In order for the drying to continue, the wood must therefore be heated again as soon as the heat applied during the heating phase has been expended. By repeating the heating and the evacuation phases a sufficient number of times, the wood will be gradually dried out to the desired wood dampness.

With the discontinuous vacuum drying method, the dampness of the wood is controlled solely by that air which is circulated in the drying chamber during the heating phase. During the evacuation phase, on the other hand, no control is effected, and the course of the drying process may easily be one in which the surface of the wood is dried out strongly during the evacuation phase, and thereafter be dampened during the subsequent heating phase. This is unfortunate, the reason being that the energy consumed during the drying process is thus needlessly increased, and also that the control of the wood dampness becomes very irregular.

With the continuous vacuum drying, the heating and evacuation are effected concurrently. In these systems, the heating of the wood is carried out by submerging the wood in hot oil (U.S. Pat. publication No. 3,811,200), or by arranging hot plates between the individual layers of wood. As will appear later, these two forms of heating result, however, in a very irregular drying of the wood. U.S. Pat. publication No. 4,194,296 describes a system for the recovery of the heat consumed in the vacuum drying of wood. However, the operation of the heat recovery system described in U.S. Pat. publication No. 4,194,296 is very energy-demanding, in that the heat pump compressor used in the system works with high vacuum on the induction side, and considerable amounts of air arise in the compressed steam. Both conditions give rise to a considerable consumption of energy in the operation of the heat pump compressor.

The object of the invention is to present a method of the kind revealed in the introduction, by which method the drying process can take place more quickly, more gently and with a lower consumption of energy than that in the above-mentioned publications, and which method can furthermore lend itself to a considerable degree of automation.

This object is achieved by the method according to the invention, which is characteristic in that one substitutes the evacuated air with superheated steam, and that one regulates the wood dampness and thereby the drying process by controlling the pressure and the temperature of said superheated steam, and in that the pressure and the temperature of the superheated steam is held as uniformly as possible in the drying chamber.

By evacuating the air from the drying chamber as stated, one achieves a far easier controlling of the drying process and the aimed at heat recovery, and said effective control reduces the total energy consumed in the drying to a considerable degree. Moreover, by the said evacuation of the air from the drying chamber, one also achieves that the risk of corrosion of the materials built into the drying chamber is strongly reduced. Similarly, the risk of the wood which is stacked in the drying chamber suffering miscoloration as a consequence of chemical oxidization or as a result of fungus and mould formation is also strongly reduced. Furthermore, the transfer of heat from the heating and cooling surfaces in the drying plant will also be far more effective than if air was present in the overall system. Any possible air will serve as a heat-insulating layer around all heat transferring surfaces, and will consequently result in a considerable increase in the energy consumed in the operation of possible heat pump compressors. If there is air in the system, the compressor used in the heat pump system must work with a much greater difference in pressure between the compressor's induction side and compression side. Similarly, the compressor must have a far greater capacity than if the vapours consist of pure steam, which will lead to a greater consumption of energy.

As will appear from the following, the methods presented in the sub-claims are expedient forms of embodiments in following the method for the drying of wood or wood-based products as presented in the main claim.

Figure 2A:
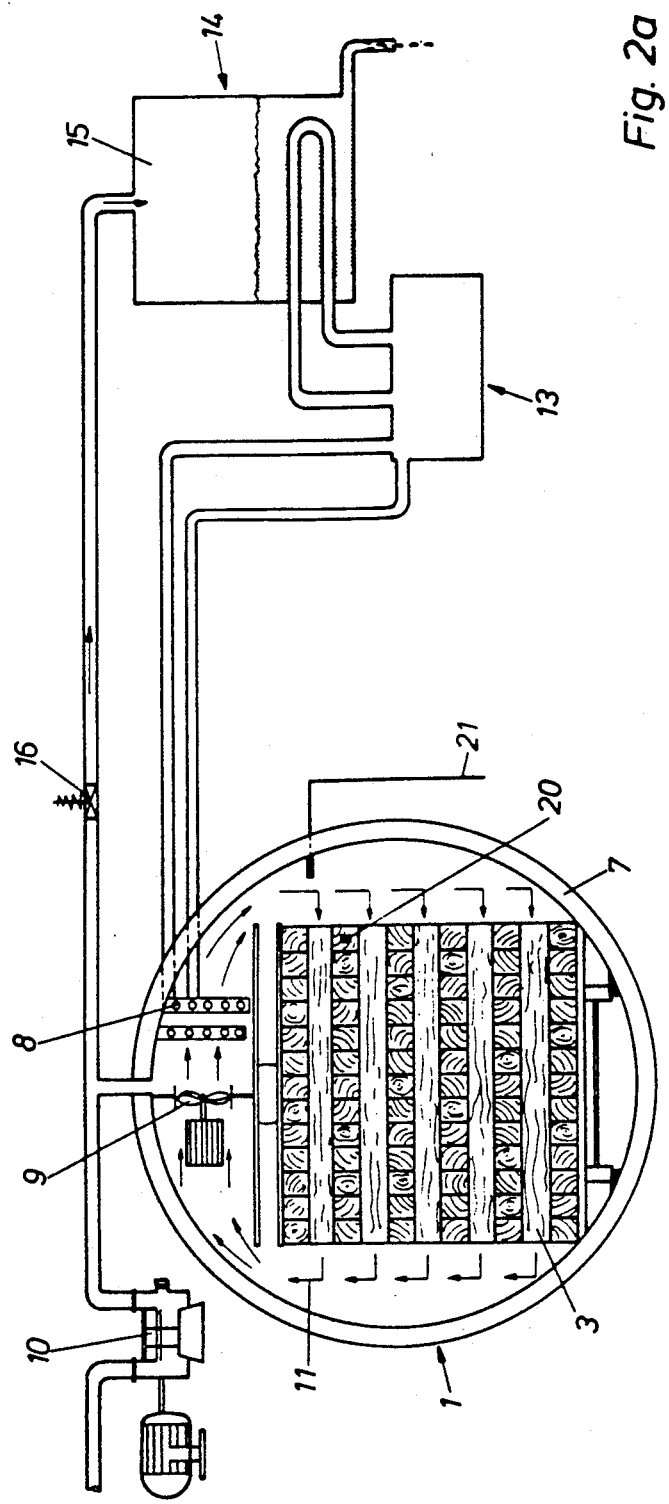
Figure 2B:
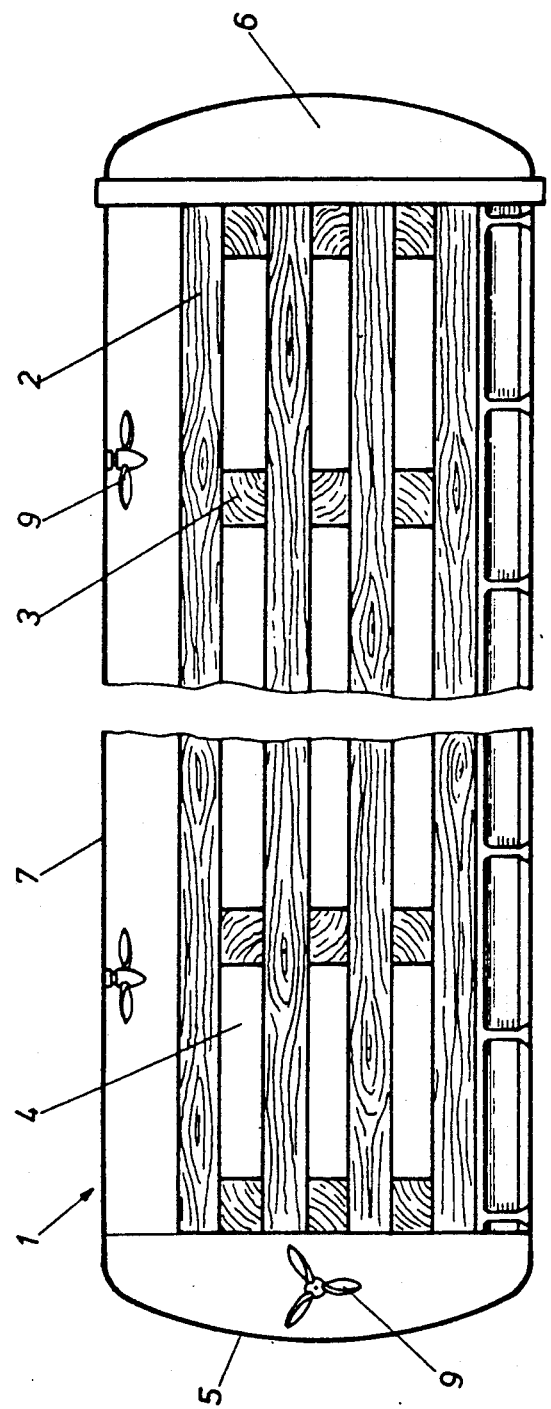
Figure 3A:
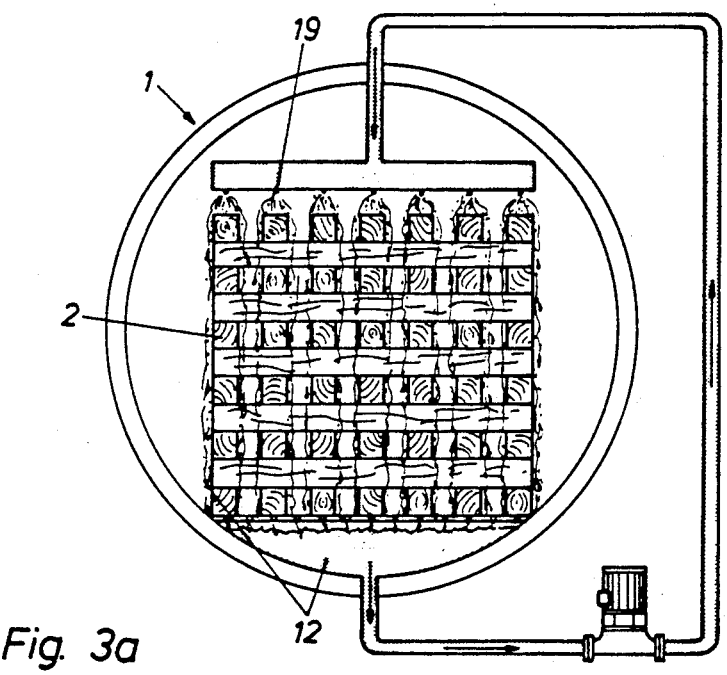
Figure 4:
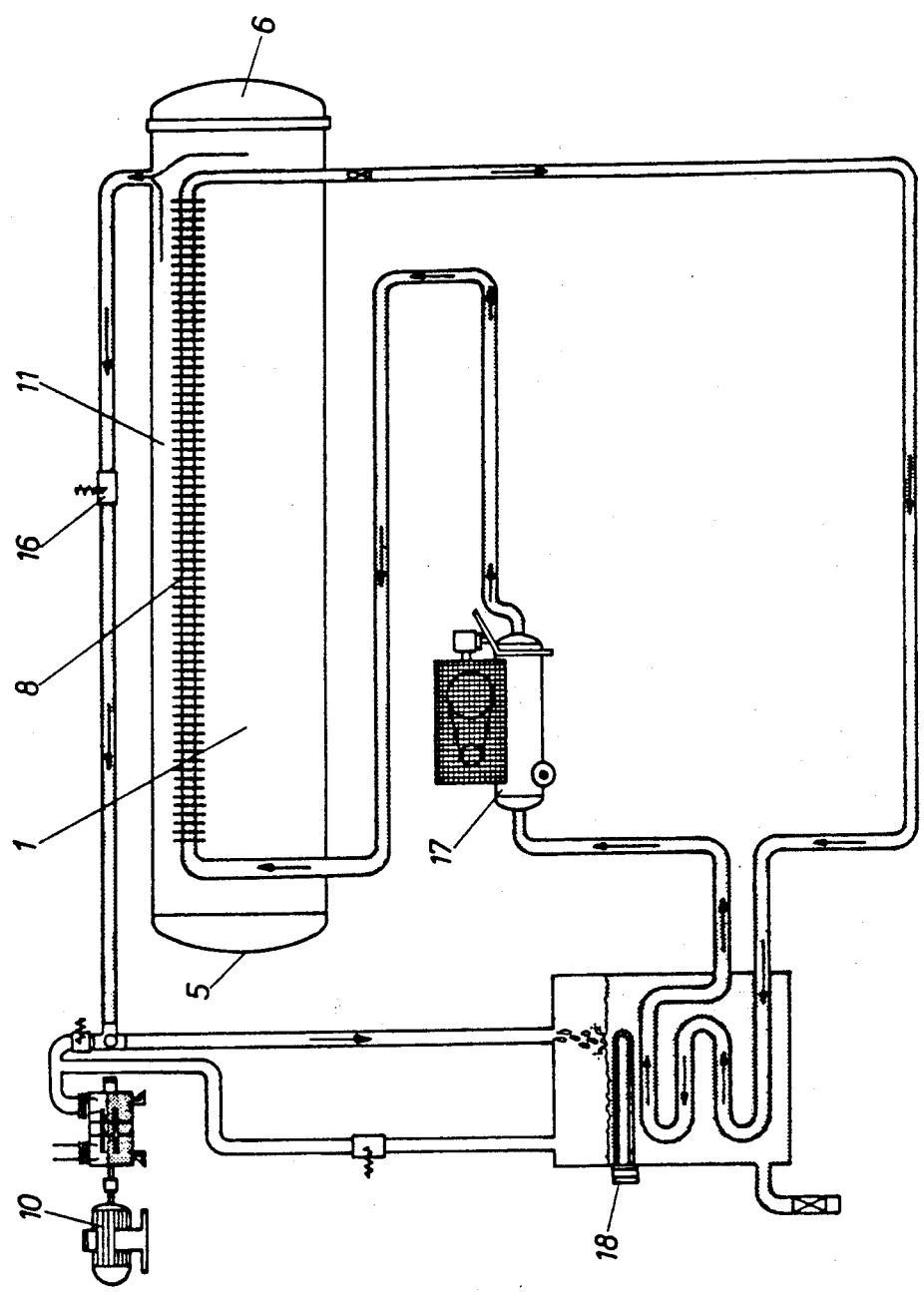
Figure 5:
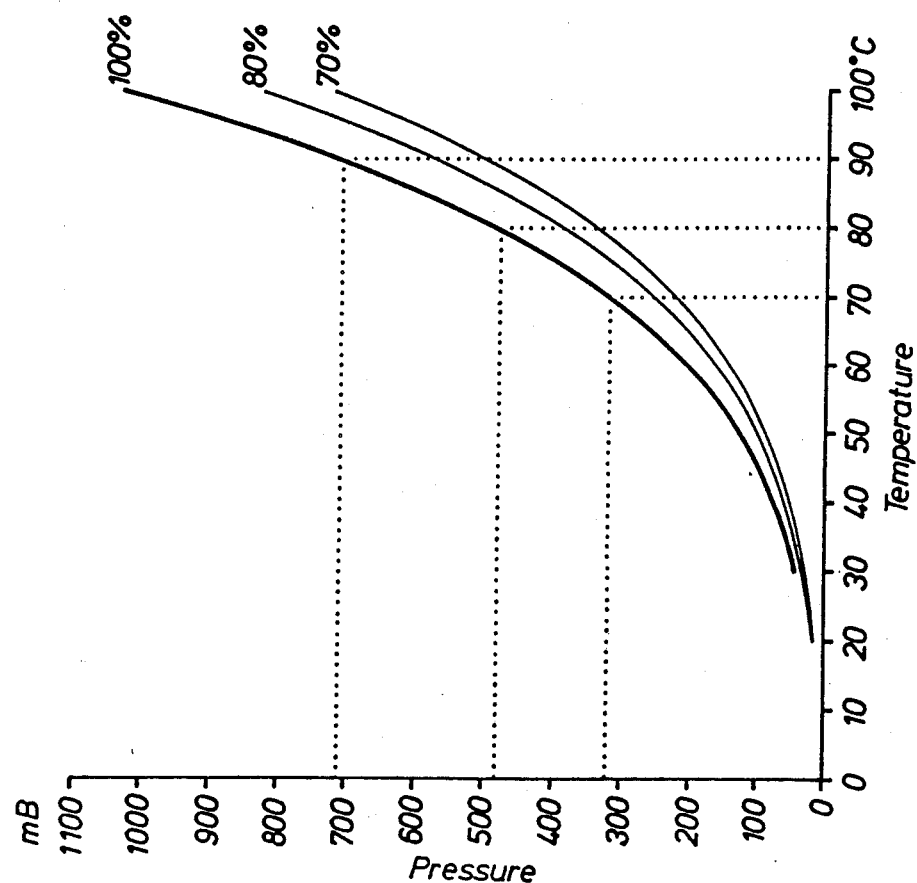

In the following, the method according to the invention is described more closely with reference to the drawing, where FIG. 1 shows a diagram illustrating the relationship between temperature, relative humidity (RH) and wood dampness (EQ), FIG. 2a shows a wood drying plant for use in the execution of the method according to the invention, where the plant is shown schematically and the drying chamber in cross section, FIG. 2b shows the drying chamber in longitudinal section, FIG. 3a and b shows two different methods for the heating of wood by the application of a heated fluid heat transmission medium to the wood which is to be dried by the method according to the invention, FIG. 4 shows schematically a plant for the drying of wood, comprising a heat pump system for use in the execution of the method according to the invention, FIG. 5 shows a diagram covering the relationship between steam pressure and temperature, and FIG. 6a and b shows schematically two different methods for the automatic control of a pressure-regulating valve.

In FIG. 1, a diagram shows the relationship between temperature, relative humidity (RH) and wood dampness (EQ), said diagram having appeared in "Timber Drying Manual" by G. H. Pratt, 1986.

In FIG. 2a and 2b is seen a drying autoclave 1 containing wood 2 which is stacked in layers with cross-beams 3 as intermediary layers for the formation of a timber pack, so that open spaces 4 are created between the layers of wood. To prevent the loss of heat during the drying process, the drying chamber 1 is provided with heat insulation which is not shown in FIG. 2a and b, and for the introduction and removal of the wood 2, the drying chamber 1 has openings which can be closed with a cover 6 or similar sealing element. When in operation, the drying chamber 1 can be exposed to overpressure and low pressure respectively, and thus the wall 7 is arranged in such a way that it is pressure-constant. Further, the drying chamber is preferably cylindrical in shape with a convex end plate. Elements 21 are also provided in the drying chamber 1 for the measurement and control of temperature and pressure.

At the beginning of the drying process, the drying chamber's end openings are first closed substantially airtight with the covers 6, after which the air in the drying chamber, including the air contained in the wood 2, is evacuated by means of a vacuum pump 10 shown in FIG. 2a.

After the air has been evacuated from the drying chamber 1, the space around the wood 2 is filled out with superheated vapour 11. This vapour 11 can either be introduced from outside or can originate from water which has evaporated from the wood 2. During the main part of the drying, the superheated steam will originate from water which has evaporated from the wood 2.

The wood is thereafter heated to the desired drying temperature, and the heating can take place in various ways, among others the following: (a) with one or more blowers 9 circulating the superheated steam 11 existing in the drying chamber 1 past the surface of the wood 2, (b) by flushing the wood 2 with a heated fluid heat transmission medium 12 which is supplied from nozzles 19 disposed in the drying chamber, (c) by repeated brief submersion in a heated fluid heat transmission medium 12.

The wood is heated by means of the heating pipes 8 shown in FIG. 2a and b, for example finned pipes or heating tubes, and by convection of the vapours given off by the wood when it dries. To ensure a rapid and uniform heating of the wood 2, the vapours are pressed into circulation through the spaces 4 between the individual layers of wood by the blowers 9. The spaces 4 between the individual layers of wood, and the breadth of same, are chosen so that during their circulation through the timber pack, the decline in temperature of the vapours is such that their heat content is utilized in the best possible way, while at the same time the different parts of the timber pack are uniformly dried.

The system described in U.S. Pat. publication No. 3,811,200, where the wood is heated by being submerged in an oil bath, results in very irregular drying when using the continuous vacuum drying of the wood. In submerging the wood in oil, the oil will affect the wood with a certain pressure, and this pressure is lowest in the upper part of the oil bath and highest in the lower part of the oil bath. The uneven pressure around the wood leads to a very irregular drying of the wood. Instead of the system described in U.S. Pat. publication No. 3,811,200, with continuous vacuum drying the present invention uses the systems shown in FIG. 3a and 3b. Also with these systems a fluid heat transmission medium 12 is used for heating the wood 2, but the systems in FIG. 3a and 3b differ from that described in U.S. Pat. publication No. 3,811,200, in that during the greater part of the drying process, the fluid heat transmission medium forms only a thin membrane around the wood 2, and thus the fluid pressure of the fluid heat transmission medium 12 has only a very slight degree of influence on the vacuum around the wood 2.

Figure 3B:
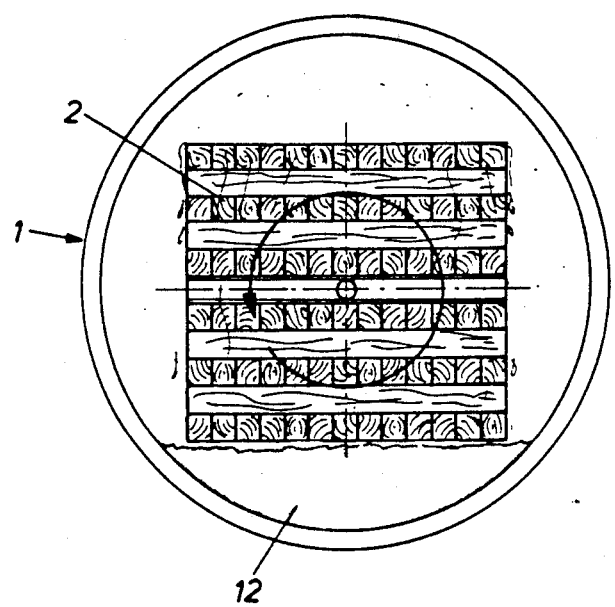

With the continuous vacuum drying, it is preferable to heat the wood 2 either by circulating the superheated steam in the drying chamber 1 past the surface of the wood 2, or by submerging/flushing the wood in a fluid heat transmission medium 12 by one of the methods shown in FIG. 3a and 3b. These methods give a very effective and uniform heating of the wood 2. The application of high-frequency, hot plates and heat radiation can also be used, but the transmission of heat with these systems is often very irregular, and this results in very irregular drying. The present invention does not, however, exclude the use of the last-mentioned methods of heating.

With continuous vacuum drying, the heat transmission medium 12 in the systems shown in FIG. 3 and 4 must have a steam pressure which is so low that the evaporation of the heat transmission medium 12 does not influence the steam pressure in the drying chamber 1.

All of the above-mentioned heating systems (superheated steam, flushing with a heated fluid heat transmission medium and repeated brief submersion in a heated fluid heat transmission medium) can be used with advantage with discontinuous vacuum drying. However, if the oil bath as described in U.S. Pat. publication No. 3,811,200 is used, it is necessary for the wood not to be held submerged in the oil during the actual evacuation phase.

To control the temperature in the drying chamber 1, the drying plant of the present invention is provided with a thermostat control 21 which shuts off the supply of heat to the above-mentioned heat radiating elements 8 each time the temperature in the drying chamber exceeds the desired value t, and opens for the supply of heat to the heat radiating elements 8 each time the temperature in the drying chamber 1 is lower than the desired value t. If the drying system is provided with the heat pump system 13 described later, the above-mentioned thermostat control 21 can be totally dispensed with.

Providing that the temperature in the wood 2 is higher than the boiling point temperature of the water, the water in the wood will be boiled out, and the water vapour arising from evaporation will be collected in the drying chamber 1. If these vapours are not removed from the drying chamber 1 gradually as they evaporate from the wood 2, the pressure in the drying chamber 1 will begin to rise, and in order to avoid the boiling point temperature of the water hereby increasing, it is necessary for the vapours evaporating from the wood 2 to be concurrently removed from the drying chamber 1.

As described in U.S. Pat. publication Nos. 3,574,949 and 4,467,532, the water vapours can be removed by condensation in the drying chamber 1. This, however, is a poor solution, in that the temperature as a result of the cooling from the heat-absorbing elements 14 hereby easily becomes very irregular in the drying chamber 1, and this results in an irregular drying of the wood.

With the present invention, the water vapours are instead removed from the drying chamber 1 by evacuating the water vapours from the drying chamber 1, and this evacuation can be effected either by means of a vacuum pump 10 or by condensation of the water vapours in a separate cooler condensing tank 15. It is preferable to use a separate cooler condensing tank 15, in that the use of vacuum pump 10 is very energy -demanding.

The evacuation by means of a cooler condensation tank 15 is effected by holding a temperature in the cooler condensation tank 15 which is equal to or lower than the dew point temperature TD of the water vapours present in the drying chamber 1:

$$TD = \frac{2260}{8.94 - \log p} - 273 \qquad (1)$$

where TD=the dew point temperature of the water vapours measured in degrees centigrade, and
p=the pressure of the water vapours in the drying chamber measured in mmHg absolute pressure.

If the temperature in the cooler condensation tank 15 is equal to TD, and the cooler condensation tank does not contain any air, the pressure in the cooler condensation tank 15 will be equal to the pressure p in the drying chamber 1, and the cooler condensation tank 15 will thus suck water vapours from the drying chamber 1 into the cooler condensation tank 15 each time the pressure in the drying chamber 1 exceeds p. If there is air in the cooler condensation tank 15, in order to evacuate the drying chamber 1, it will be necessary to cool the water vapours in the cooler condensation tank 15 to a temperature which is lower than TD. Since this reduction in temperature will mean an extra energy consumption in the case of the cooling being effected by the use of a heat pump system 13, it is important that the cooler condensation tank 15 is constantly held completely evacuated, and to remove possible air from the cooler condensation tank 15, there should be possibility of being able to evacuate the air from the cooler condensation tank 15 by means of a vacuum pump 10.

Even though there is no air in the cooler condensation tank 15, in practice one will use a temperature in the cooler condensation tank 15 which is lower than TD. The reason for this is that if the temperature of the cooler condensation tank 15 is TD, then there will be no difference in temperature between that of the cooling surface and the condensation temperature of the water vapours, and the condensation of the water vapours in the cooler condensation tank 15 will demand an infinitely large cooling surface.

If the temperature in the cooler condensation tank 15 is lower than TD, the pressure in the cooler condensation tank 15 will be lower than the pressure p in the drying chamber 1. In order to prevent the pressure in the drying chamber from falling, it is thus necessary to have a pressure regulating valve 16 between the drying chamber and the cooler condensation tank 15 (see FIG. 2a), which opens each time the pressure in the drying chamber 1 exceeds the desired value p, and closes each time the pressure in the drying chamber 1 is lower than the desired value p.

As cooling elements in the cooler condensation tank 15, it can be of great advantage to use a heat pump system 13 which transfers the heat developed in the condensation of the water vapours to the drying chamber 1. This system is presented in FIG. 4, which shows how a cooling medium, for example freon or ammonia, is circulated by means of a compressor 17 between the heat-absorbing elements provided in the cooler condensation tank 15, and the heat-radiating elements 8 provided in the drying chamber 1.

Providing that a constant pressure is maintained in the drying chamber 1, the above-mentioned pressure regulating system will ensure that per unit of time, there will constantly be removed the same amount of steam from the drying chamber 1 as evaporates from the wood 2, and since by the condensation of the water vapours in the cooler condensation tank 15 there will in principle be released the same amount of heat per condensed unit as is consumed per evaporated unit in the evaporation of the water in the drying chamber 1, the consumption of heat in the drying chamber 1 and the radiation of heat by the cooler condensation tank 15 will, in principle, constantly correspond to each other, and the heat transferred by the heat pump system 13 will come to correspond to the amount of heat consumed in the evaporation of the water from the wood 2. With the present invention, this balance in the consumption of heat and the production of heat can be maintained during the main part of the drying process. However, in the preliminary heating phase, it will be necessary to apply heat 18 from outside, and it will also be necessary to replace that heat which is lost via heat conduction from the drying chamber 1 to the surroundings. The main part of this energy loss is, however, compensated for by that excess of energy which arises as a result of the necessity of having to supply energy 18 from outside for the operation of the heat pump compressor 17 used in the heat recovery.

The use of a heat pump system 13 for the cooling of the water vapours in the cooler condensation tank 15 is, however, only an example. All forms of heat-absorption systems can be used for the cooling of the water vapours in the cooler condensation tank 15.

In addition to controlling the heat recovery, the above-mentioned pressure regulating valve 16 also controls the dampness of the wood 2 during the drying process, for it has proved that by evacuating the air from the space around the wood 2, and instead surround the wood 2 with superheated steam, the dampness of the wood 2 can be regulated quite precisely by controlling the temperature t and the pressure p of the superheated vapours 11 existing around the wood. Therefore, the controlling of the wood dampness with the present invention is effected through the earlier-described thermostat control and the above -mentioned pressure regulating valve 16 which control the pressure p and the temperature t in the drying chamber 1.

By controlling the temperature t and the pressure p of the superheated water vapours 11 present in the drying chamber 1, with the present invention the relative humidity RH shown in FIG. 1 is controlled in accordance with the following equation:

$$RH = \frac{p \times 100}{(10^{8.94}) \times (10^{-(2260/t+273)})} \quad (2)$$

where
t = the temperature in the drying chamber measured in degrees centigrade, and
p = the pressure in the drying chamber measured in mm Hg Since for any value of RH there corresponds a certain moisture balance EQ, the dampness MC of the wood 2 can also be controlled by controlling the temperature t and the pressure p of the superheated water vapours 11.

In order for the above-mentioned equation to be used in the control of the drying process, two of the three quantities in equation 2 must be determined beforehand, while the third quantity is calculated on the basis of the two other quantities by means of equation 2.

Normally, those familiar with the art will immediately be able to determine RH and the temperature t, and the pressure p can hereafter be calculated in the following manner:

$$p = \frac{RH}{100} \times p_o \quad (3)$$
$$= \frac{RH}{100} \times (10^{8.94}) \times (10^{-(2260/t+273)})$$

where
t = the temperature in the drying chamber measured in degrees centigrade,
p = the pressure in the drying chamber measured in mm HG absolute pressure,
RH = a value between 0 and 100, which value can be determined by those familiar with the art on the basis of the actual dampness MC of the wood 2, its kind and dimension, and
po = the pressure in a closed, water-filled container in the drying chamber (see below).

RH can be determined in the following manner:
The desired moisture balance EQ for the drying can be determined on the basis of the actual dampness MC of the wood, its kind and dimension. Those familiar with the art can immediately determine EQ. However, EQ can also be determined as follows:

$$EQ = \frac{MC}{K} \quad (4)$$

where
K = the drying force and
MC = the dampness of the wood

The drying force K is an empirical value generally used in the drying of wood, and K varies depending on the actual kind of wood and its dimension. For those kinds of wood which are difficult to dry, and for wood of large dimensions, K will lie between 1.3 and 2.0, while for those kinds of wood which are easy to dry, and for wood of small dimensions, K will lie between 2.0 and 3.0.

The value RH can be found in FIG. 1 from the desired moisture balance EQ and the surmised drying temperature.

During the drying process, RH can also be determined by increasing RH each time the amount of water vapours evacuated per time unit from the drying chamber 1 exceeds a predetermined maximum value, and by lowering RH each time the amount of water vapour evacuated from the drying chamber 1 is lower than a predetermined minimum value.

Those familiar with the art can also easily determine the most expedient temperature t, and the temperature chosen is as high as possible without causing damage to the wood, i.e. for most kinds of wood a temperature of between 40 and 100° C. By choosing as high a temperature as possible, the most precise control of RH is obtained. From FIG. 5 it is thus shown clearly that a measurement inaccuracy has nothing like so great an influence on RH when the temperature is high as when the temperature is low. It is an advantage, as will appear later, for the temperature to be chosen as a temperature interval limited by a maximum and minimum temperature.

When RH and the temperature t have been determined, the pressure p is calculated as per equation 3, and thereafter the drying process is controlled in the following manner:

(a) Pressure regulating valve 16.

The above-mentioned pressure regulating valve 16 is opened each time the pressure in the drying chamber 1 exceeds the value p as determined by equation 3, while the pressure regulating valve 16 is closed each time the pressure in the drying chamber 1 is lower than the value p determined by equation 3.

(b) Thermostat regulation 21.

The supply of heat to the drying chamber 1 is opened by means of the above-mentioned thermostat regulation 21 each time the temperature in the drying chamber 1 is lower than a predetermined value for t-minimum, and the supply of heat is shut off each time the temperature in the drying chamber 1 exceeds the predetermined value for t -maximum.

t-minimum and t-maximum can well have the same value, whereby the supply of heat is shut off each time the temperature t in the drying chamber 1 exceeds the predetermined value t, and is opened each time the temperature t in the drying chamber 1 is lower than the predetermined value t.

The drying process can also be controlled by first determining RH and the pressure p, after which the temperature t is calculated in accordance with the following equation:

$$t = \frac{2260}{\log(RH/100) - \log p + 8.94} - 273 \qquad (5)$$

where
t = the temperature in the drying chamber measured in degrees centigrade,
p = the pressure in the drying chamber measured in mm Hg absolute pressure
RH = a value between 0 and 100, which value can be determined by those familiar with the art on the basis of the actual dampness MC of the wood, its kind and dimension.

The above-mentioned calculations of RH, p and t are only examples. The decisive aspect of the invention is that the dampness of the wood 2 is controlled by means of the pressure and the temperature of the superheated water vapours 11.

The value po used in equation 3 can either be measured directly or calculated on the basis of the temperature t. The value RH will not normally change particularly frequently, whereas the temperature t will often change, and in those cases where t changes often, it can be an advantage to measure po directly instead of on the basis of the temperature t. For the direct measurement of po, the drying plant can with advantage be provided with the following system:

A closed container, from which the air has been completely evacuated and instead half- or partly-filled with water, is placed in the drying chamber 1. The container has a large surface and is arranged in the drying chamber 1 in such a way that the water in the container constantly assumes the same temperature as the superheated water vapours 11 in the drying chamber 1. The water in the container will thus create a vapour pressure in the container which is equal to the vapour pressure of saturated vapour pressure at the temperature existing in the drying chamber 1, and the desired pressure p in the drying chamber 1 can thereafter be determined from the following simple equation:

$$p = \frac{RH}{100} \times po \qquad (6)$$

where
p = the desired pressure in the drying chamber,
RH = a value between 0 and 100, which value those familiar with the art can determine on the basis of the actual moistness MC, the kind and dimension of the wood 2, and
po = the pressure in the closed, water-filled container.

With this system, there is no need for a temperature measurement to control p, and the drying process is controlled by opening the pressure regulating valve 16 shown in FIG. 2a each time the pressure in the drying chamber is greater than RH/100 x po, and by closing the pressure regulating valve 16 shown in FIG. 2a each time the pressure in the drying chamber 1 is less than RH/100 x po. This control of the pressure regulating valve 16 can be built up relatively simply, for example as the mechanical control shown in FIG. 6.

Figure 6A:
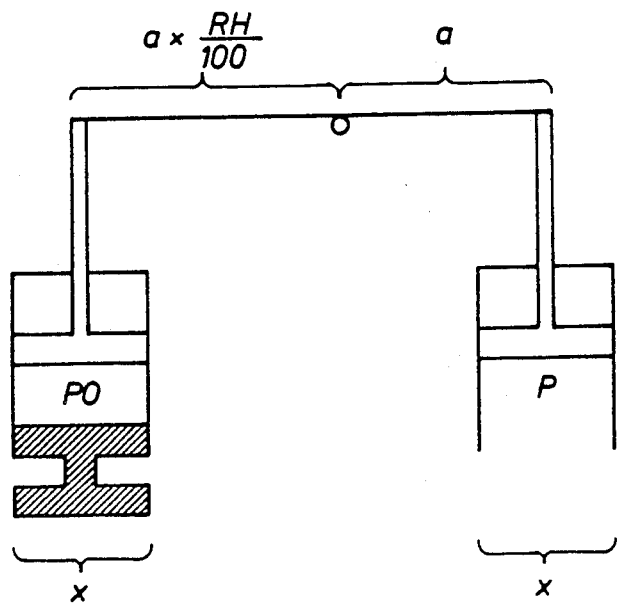
Figure 6B:
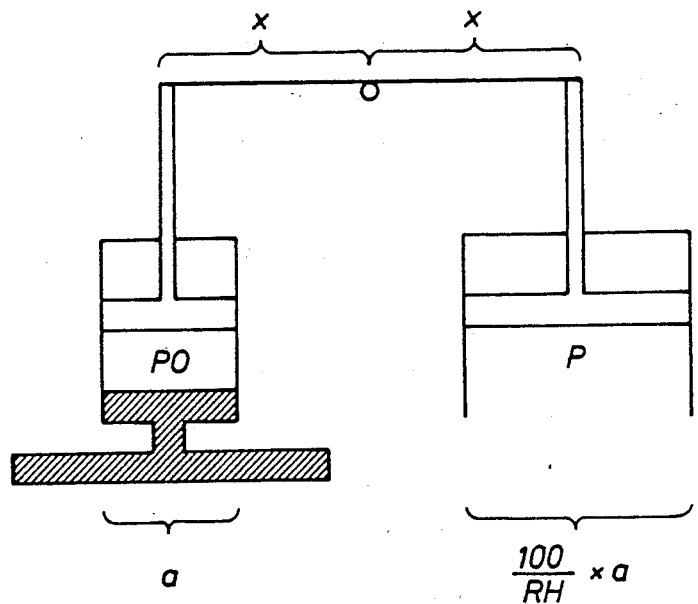

The control in FIG. 6 consists of two pistons, where the pressure on the one piston is equal to p, and the pressure on the other piston is equal to po. Each time the pressure on the second piston is pressed up, the pressure regulating valve 16 shown in FIG. 2a will be opened, while the pressure regulating valve 16 will be closed each time the first piston is pressed up. The control of RH is effected either by changing the position of the lever's fulcrum (see FIG. 6a), or by changing the area of the pistons (see FIG. 6b).

The use of lever and pistons is only an example. The above-mentioned control can be effected with all forms of mechanical or electronic pressure transmitters combined with an electronic or mechanical proportional control.

For the control of the temperature, with the present invention it can be an advantage to use a temperature interval limited by a maximum temperature and a minimum temperature. The magnitude of this temperature interval depends on the extent to which the drying is carried out as a continuous or discontinuous vacuum drying process.

(a) Discontinuous vacuum drying.

The discontinuous vacuum drying process is used particularly in the drying of woods with low permeability, for example oak and eucalyptus.

During the drying of those kinds of woods having low permeability, a small difference in pressure will arise in the wood 2 as a result of the difficulty with which the water evaporated during the drying forces its way out of the wood. This difference in pressure is equal to p1−p2, where $$p1 = \frac{RH1}{100} \times (10^{8.94}) \times (10^{-(2260/t1+273)}) \qquad (7)$$

$$p2 = \frac{RH2}{100} \times (10^{8.94}) \times (10^{-(2260/t2+273)})$$

RH2
t1 = the temperature in the tree measured in degrees centigrade, t2=the temperature in the drying chamber measured in degrees centigrade, p1=the pressure in the wood measured in mm Hg absolute pressure, p2=the pressure in the drying chamber measured in mm Hg absolute pressure, RH1=the RH value in FIG. 1, which at a temperature of t1 gives a moisture balance (EQ) which is equal to the actual dampness (MC) of the wood, and RH2=the RH value in FIG. 1, which at a temperature of t2 gives a moisture balance (EQ) which is equal to the desired moisture balance in the surface of the wood.

Under normal drying conditions, the pressure difference p1−p2 will be positive. In the drying of wood, where a relatively constant temperature is used (continuous vacuum drying), the pressure difference p1−p2 will be too small in woods with low permeability to be able to press the water vapours out of the wood 2. In order to increase the difference in pressure between p1 and p2, it is necessary to increase the difference between RH1 and RH2 or the difference between t1 and t2. The first solution cannot be used, the reason being that the surface of the wood is hereby dried out too quickly. The second solution, on the other hand, is possible, and is achieved by carrying out the drying as a kind of discontinuous vacuum drying process. With the discontinuous vacuum drying process, the wood 2 is cooled during the evacuation phase considerably more quickly at the surface than the inside of the wood 2, and thus the difference between t1 and t2 is increased.

With the present invention, the discontinuous vacuum drying is effected by heating the wood 2 during the heating phase until the wood 2 has reached the desired maximum temperature, and by controlling the pressure in the drying chamber 1 in such a manner that the moisture balance EQ in the surface of the wood 2 in the heating phase is equal to or slightly higher than the dampness MC inside the wood 2. During the subsequent evacuation phase, the supply of heat to the drying chamber is completely shut off, and the pressure in the drying chamber 1 is controlled in such a manner that the moisture balance EQ in the surface of the wood 2 becomes equal to or slightly lower than the wood dampness MC inside the wood 2.

With the present invention, the discontinuous vacuum drying distinguishes itself from the traditional discontinuous vacuum drying processes in that (1) the air is completely evacuated from the drying chamber during both the heating phase and the evacuation phase, (2) the wood 2 is surrounded by superheated steam 11 during both the heating phase and the evacuation phase, and (3) the moisture balance EQ in the surface of the wood 2 is controlled during both the heating phase and the evacuation phase.

(b) Continuous vacuum drying.

When drying woods which are easy to dry, the pressure difference p1−p2 is normally high enough to press the water vapours out of the wood 2, and in this case the drying can with advantage be a form of continuous vacuum drying, where evacuation and heating take place concurrently.

But also when the drying is effected as a continuous vacuum drying process there can be a need for the temperature t in the drying chamber 1 not to lie constant. This is thus the case with the use of the heat recovery system 14 described earlier.

Even though the pressure regulating system in the continuous vacuum drying system ensures to a high degree that the heat consumption and the heat production follow each other, there will always arise certain fluctuations in heat production versus heat consumption, and in order to ensure that these fluctuations are leveled out, it is necessary to have a form of heat accumulation system which collects heat during those periods when there is a surplus of heat, and which radiates heat during those periods when there is a heat deficiency. For this purpose, advantageous use can be made of the wood mass 2 in the drying chamber 1. The heat capacity of the wood mass 2 is quite considerable, and by transferring the surplus heat direct from the heat pump system 13 to the wood 2, the temperature of the heat side of the heat pump system 13 is held lower than if the heat is transferred to the wood 2 via a separate heat accumulation system. This is because with each transfer of heat, a certain difference in temperature is necessary between the heat radiating element 8 and the heat absorption element 15, and since the energy consumption of the heat pump system 13 increases sharply each time the heat side of the heat pump system 13 must be increased in relation to the temperature on the heat pump system's cooling side, the number of times that heat is transferred should be limited as much as possible. Moreover, the use of the wood mass as heat accumulation system does not give rise to any extra investments.

In this case, the control of the drying and heat recovery process is effected as follows:

The control of the heat pump compressor 17 is effected by starting the compressor 17 each time the temperature in the cooler condensation tank 15 exceeds TD - x, and stopping the compressor 17 each time the temperature is lower than TD - x. TD is equal to the dewpoint temperature of the water vapours existing in the drying chamber 1, and is calculated in accordance with equation 1, while x is determined on the basis of the size of the cooling surface. The larger the cooling surface, the smaller the value used for x.

The pressure regulating valve 16 is opened each time the pressure in the drying chamber 1 exceeds the value p for the pressure in the drying chamber 1 calculated in accordance with equation 3 or 6, and the pressure regulating valve 16 is closed each time the pressure in the drying chamber 1 is less than p.

To compensate for possible permanent differences in the heat production/consumption of the drying system, heat is added to the drying chamber 1 from an external source of heat 18 each time the temperature t in the drying chamber 1 is less than t minimum, while heat is radiated from the cooler condensation tank 15 to the surroundings each time the temperature t in the drying chamber 1 is greater than t maximum. The size of the interval t-max minus t-min depends on the extent of the temporary fluctuation existing between the heat production and the heat consumption. The greater the fluctuations, the larger the buffer capacity needed, and thus the greater the interval t-max minus t-min must be.

In order to limit the energy needed for the operation of the heat pump compressor 13, it should be ensured that the choice of both the interval t-max minus t-min and the interval TD - x are as low as possible. The difference in temperature between the heat pump system's 14 heat side and cooling side is hereby limited, and the smaller this difference in temperature, the lower the energy consumption of the compressor 17.

I claim:

1. An improved method for the removal of moisture from solid wood and other wood-based products, whereby the wood is first stacked with suitable air space in a drying chamber which is arranged to be able to withstand a vacuum and temperatures of up to 100° C, after which the drying chamber is closed and evacuated during the introduction of heat for the boiling out of the moisture bound in the wood, the method being the type in which one replaces the evacuated air with water vapour, the improvement comprising regulating the wood dampness and thereby the drying process by superheating said water vapour and controlling the pressure and the temperature of said superheated water vapour, and maintaining the pressure and the temperature of the superheated vapour as uniformly as possible in the drying chamber, wherein during the drying process the water vapours are evacuated from the drying chamber by condensing the vapours in a separate cooler condensation tank, in which there is maintained a temperature lower than the dewpoint temperature of the superheated vapours existing in the drying chamber, the wood dampness and the drying process are controlled by opening a pressure regulating valve provided between the drying chamber and the cooler condensation tank each time the pressure in the drying chamber exceeds the value p, where p depends on the following equation:

$$p = \frac{RH}{100} \times (10^{8.94}) \times (10^{-(2260/t+273)}),$$

where
p = the pressure in the drying chamber measured in mm Hg absolute pressure,
RH = a value between 0 and 100, which value can be determined by those familiar with the art on the basis of the actual dampness MC, the kind and the dimension of the wood, and
t = the actual temperature in the drying chamber measured in °C,
and by closing the pressure regulating valve each time the pressure in the drying chamber is lower than p.

2. The method according to claim 1, wherein the wood stacked in the drying chamber is heated by flushing the wood with a liquid heat transmission medium, which is heated with one or more heat radiating elements disposed in connection with the drying chamber.

3. The method according to claim 1, wherein the drying chamber is partly filled with a liquid heat transmission medium which is heated with one or more heat radiating elements disposed in connection with the drying chamber, and that the stacked wood is heated by rotating the wood for repeated brief submersion in the heated heat transmission medium in the bottom of the drying chamber.

4. An improved method for the removal of moisture from solid wood and other wood-based products, whereby the wood is first stacked with suitable air space in a drying chamber which is arranged to be able to withstand a vacuum and temperatures of up to 100° C, after which the drying chamber is closed and evacuated during the introduction of heat for the boiling out of the moisture bound in the wood, the method being the type in which one replaces the evacuated air with water vapour, the improvement comprising regulating the wood dampness and thereby the drying process by superheating said water vapour and controlling the pressure and the temperature of said superheated water vapour, and maintaining the pressure and the temperature of the superheated vapour as uniformly as possible in the drying chamber, wherein during the drying process the water vapours are evacuated from the drying chamber by condensing the water vapours in a separate cooler condensation tank, in which there is maintained a temperature lower than the dewpoint temperature of the superheated vapours existing in the drying chamber the wood dampness and the drying process are controlled by opening a pressure regulating valve provided between the drying chamber and the cooler condensation tank each time the pressure in the drying chamber exceeds the value p, where p depends on the following equation:

$$p = \frac{RH}{100} \times po$$

where
p = the pressure in the drying chamber measured in mm Hg absolute pressure,
RH = a value between 0 and 100, which value can be determined by those familiar with the art on the basis of the actual dampness MC, the kind and dimension of the wood, and
po = the pressure in a closed container from which the air has been completely evacuated, and instead completely or partly filled with water, said container being arranged in the drying chamber in such a manner that the water in the container constantly assumes the same temperature as the superheated vapours in the drying chamber,
and by closing the pressure regulating valve each time the pressure in the drying chamber is lower than p.

5. The method according to claim 4, wherein the water vapours are colled in the cooler condensation tank by transferring the heat released by the condensation to the drying chamber by circulating a cooling medium, for example ammonia or freon, with a cooling compressor, between heat absorbing elements disposed in the cooler condensation tank and heat radiating elements disposed in the drying chamber, the cooling compressor being started each time the temperature in the cooler condensation tank is higher than TD - X, and that the cooling compressor is stopped each time said temperature is lower than TD - X, TD being the dewpoint temperature of the superheated vapours in the drying chamber, and the value of x is determined beforehand on the basis of the size of the cooling surface.

6. The method according to claim 5, characterized in that the wood stacked in the drying chamber is used as a heat-store in the event of possible temporary discrepancies between the heat recovery, and the heat consumed in the evaporation of the moisture bound in the wood, in that the temperature in the drying chamber is allowed to fluctuate within an interval given by t - y, where t is determined beforehand as a maximum desirable drying temperature, and y is determined beforehand as a maximum temperature deviation which is allowed to arise between the heat released in the cooler condensation tank and the heat consumed in the drying chamber, and that in the event of a possible permanent discrepancy between the heat recovery and the heat consumed in the drying chamber, the temperature in the drying chamber is controlled by supplying heat to the drying chamber from an external heat source each time the temperature in the drying chamber is lower than t - y, while allowing heat to be transferred to the surroundings each time the temperature in the drying chamber is higher than t, and that when the temperature is between t and t - y, all the heat for the evaporation of the moisture bound in the wood is allowed to originate from the exchange of heat.

7. The method according to claim 5, characterized in that wood of the kind with low permeability is dried by a modified discontinuous vacuum drying, wherein repeated changes are made between a heating phase ad an evacuation phase, in that during the heating phase the wood is heated until it has reached a beforehand determined maximum temperature while at the same time being controlled by the pressure in the drying chamber, in such a manner that the moisture balance in the surface of the wood is held equal to or slightly higher than the dampness MC on the inside of the wood, and that during the evacuation phase the supply of heat to the drying chamber is shut off during simultaneous control, by the pressure in the drying chamber, in such a manner that the moisture balance in the surface of the wood is held equal to or slightly lower than the dampness on the inside of the wood.

8. The method according to claim 4, wherein the wood stacked in the drying chamber is heated by flushing the wood with a liquid heat transmission medium, which is heated with one or more heat radiating elements disposed in connection with the drying chamber.

9. The method according to claim 8, wherein the drying chamber is partly filled with a liquid heat transmission medium which is heated with one or more heat radiating elements disposed in connection with the drying chamber, and that the stacked wood is heated by rotating the wood for repeated brief submersion in the heated heat transmission medium in the bottom of the drying chamber.

10. The method according to claim 1, wherein the water vapours are colled in the cooler condensation tank by transferring the heat released by the condensation to the drying chamber by circulating a cooling medium, for example ammonia or freon, with a cooling compressor, between heat absorbing elements disposed in the cooling condensation tank and heat radiating elements disposed in the drying chamber, the cooling compressor being started each time the temperature in the cooler condensation tank is higher than TD - X, and that the cooling compressor is stopped each time said temperature is lower than TD - X, TD being the dewpoint temperature of the superheated vapours in the drying chamber, and the value of x is determined beforehand on the basis of the size of the cooling surface.

11. The method according to claim 1 characterized in that the wood stacked in the drying chamber is used as a heat-store in the event of possible temporary discrepancies between the heat recovery, and the heat consumed in the evaporation of the moisture bound in the wood, in that the temperature in the drying chamber is allowed to fluctuate within an interval given by t - y, where t is determined beforehand as a maximum desirable drying temperature, and y is determined beforehand as a maximum temperature deviation which is allowed to arise between the heat released in the cooler condensation tank and the heat consumed in the drying chamber, and that in the event of a possible permanent discrepancy between the heat recovery and the heat consumed in the drying chamber, the temperature in the drying chamber is controlled by supplying heat to the drying chamber from an external heat source each time the temperature in the drying chamber is lower than t - y, while allowing heat to be transferred to the surroundings each time the temperature in the drying chamber is higher than t, and that when the temperature is between t and t - y, all the heat for the evaporation of the moisture bound in the wood is allowed to originate from the exchange of heat.

12. The method according to claim 1, characterized in that wood of the kind with low permeability is dried by a modified discontinuous vacuum drying, wherein repeated changes are made between a heating phase and an evacuation phase, in that during the heating phase the wood is heated until it has reached a beforehand determined maximum temperature while at the same time being controlled by the pressure in the drying chamber, in such a manner that the moisture balance in the surface of the wood is held equal to or slightly higher than the dampness MC on the inside of the wood, and that during the evacuation phase the supply of heat to the drying chamber is shut off during simultaneous control, by the pressure in the drying chamber, in such a manner that the moisture balance in the surface of the wood is held equal to or slightly lower than the dampness on the inside of the wood.

* * * * *